United States Patent

[11] 3,586,894

| [72] | Inventor | Philip M. Mueller<br>Derby, Kans. |
|---|---|---|
| [21] | Appl. No. | 875,891 |
| [22] | Filed | Nov. 12, 1969 |
| [45] | Patented | June 22, 1971 |
| [73] | Assignee | Lear Siegler, Inc.<br>Santa Monica, Calif. |

[54] SERVOMOTOR
4 Claims, 2 Drawing Figs.

| [52] | U.S. Cl. | 310/178 |
|---|---|---|
| [51] | Int. Cl. | H02k 31/00 |
| [50] | Field of Search | 310/178, 102 |

[56] References Cited
UNITED STATES PATENTS

| 339,839 | 4/1886 | Batchelor et al. | 310/178 |
|---|---|---|---|
| 523,998 | 8/1894 | Rennerfelt | 310/178 |
| 2,633,545 | 3/1953 | Rieth | 310/102 |

Primary Examiner—D. X. Sliney
Attorney—Bosworth, Sessions, Herrstrom & Cain

ABSTRACT: A homopolar machine provided with a plurality of electrically conductive rotor discs axially spaced and mounted on the shaft of the machine and a plurality of electrically conductive stator discs interleaved between the rotor discs and keyed against rotation to the housing. Adjacent stator and rotor discs are electrically in contact in a manner effectively connecting the rotor discs electrically in series. The torque or voltage developed by the machine is the sum of the torques or voltages developed in each rotor disc.

PATENTED JUN 22 1971 3,586,894

INVENTOR.
PHILIP M. MUELLER
BY Bosworth, Sessions
Herrstrom & Cain
ATTORNEYS

SERVOMOTOR

BACKGROUND OF THE INVENTION

This invention relates to homopolar dynamoelectric machines. Typically, such machines comprise a metallic disc mounted for rotation in a plane normal to a magnetic flux field. Electric current flows radially in the disc in the generator and motor modes of operation. The amount of torque is proportional to the square of the radius of the rotor within the magnetic flux field. The direction of current flow depends upon rotor and field direction.

A principal disadvantage of homopolar machines for many applications has been that they are high-current, low-voltage machines. This disadvantage has been reduced by increasing the number of discs that rotate in the magnetic field. If these discs are effectively connected in series, the motor torque or generator voltage developed by the machine is the sum of the torques or voltages in these discs.

Numerous arrangements of brushes have been tried in multiple-disc machines in order to connect a number of rotating discs in series. Commonly, one pair of brushes is required for each disc; e.g., one at the center and one at the outer periphery. This can result in a large number of brushes. The disposition, maintenance, and replacement of large numbers of brushes have been a problem, limiting the use of the multiple-disc homopolar machine.

In particular, the homopolar design is well suited for servomotor applications. A servomotor of the homopolar type is possessed of a high torque-to-inertia ratio; and, because its magnetic field is static and unidirectional, such a machine is capable of fast response when reversing its direction of rotation. The problem of brush arrangement noted above, however, has limited the servomotor use of homopolar-type machines.

SUMMARY OF THE INVENTION

A general object of this invention is to provide a multiple-disc homopolar machine that solves the problems associated with prior art multiple-disc homopolar machines. A more particular object is the provision in a multiple-disc homopolar machine of unique electrical contacts and connections that overcome the disadvantages of prior brush arrangements for multiple-disc machines. A still more particular object is the provision in a multiple-disc homopolar machine of a system of electrical connections that is simple and compact, and in which the contacts are conveniently accessible for inspection, maintenance, or replacement.

Another object is the provision of a multiple-disc homopolar machine in which the number of discs may be easily and conveniently varied to change the output rating of the machine.

Still another object is the provision of a multiple-disc homopolar servomotor capable of fast response and possessed of a high torque-to-inertia ratio.

A preferred embodiment of this invention comprises a homopolar electrodynamic machine having a housing, a shaft supported for rotation in the housing, a plurality of rotor discs positioned along the shaft for rotation therewith, and a plurality of stator discs supported in the housing and interleaved between the rotor discs. An electromagnetic coil for producing a unidirectional flux field passing axially through the discs is supported by the housing. Means are provided, preferably on the stator discs, for electrically connecting the generally center portions of each stator disc and one of its adjacent rotor discs. Similar means are provided for electrically connecting the generally peripheral portions of each stator disc and the other of its adjacent rotor discs. The rotor discs are thereby connected electrically in series and in such a manner that current passing through the machine is directed through all the rotor discs serially and in the same radial direction; e.g., either inwardly toward the shaft, or outwardly toward the periphery of the discs.

DESCRIPTION OF THE PREFERRED EMBODIMENTS

Figure 1:
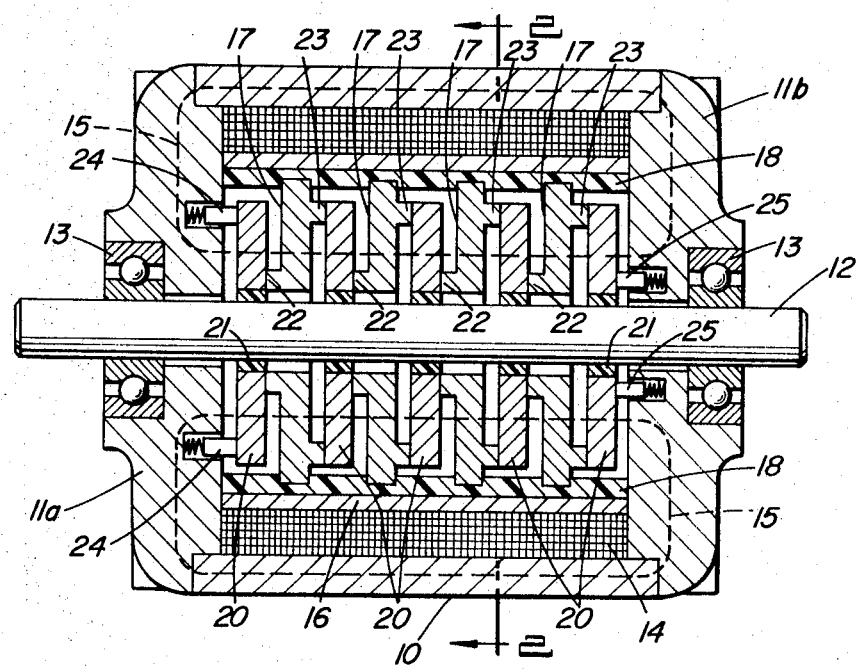
FIG. 1 is an axial cross section of a multiple-disc homopolar machine embodying this invention.

As seen particularly in FIG. 1, the homopolar machine embodying this invention broadly comprises a stator portion and a rotor portion. The stator is supported by a cylindrical housing 10 having end bells 11a and 11b. The rotor is carried on shaft 12 supported for rotation concentrically with the stator in bearings 13 in the end bells.

Housing 10, preferably of magnetic material, supports an annular electromagnetic coil 14 for providing a unidirectional flux field extending axially through cylindrical housing 10. Coil 14 is adapted to be energized in a conventional manner from a source of DC power (not shown). The flux path of the coil is indicated in FIG. 1 by broken line 15 and includes housing 10, end bells 11a and 11b of magnetic material. The central portion of the stator is lined with a sleeve 16 of nonmagnetic material such as stainless steel which does not provide a shunt path for the flux produced by coil 14.

Figure 2:
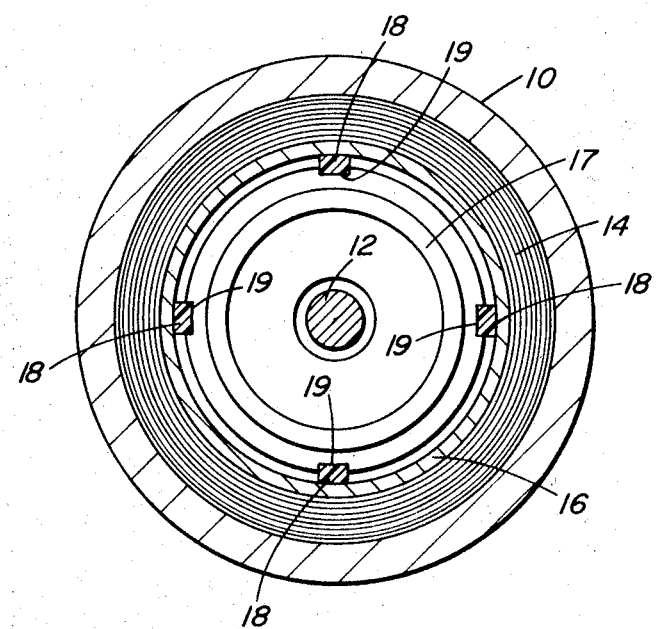
FIG. 2 is a transverse section of the machine shown in FIG. 1 taken in the plane of line 2–2 in FIG. 1.

The stator also comprises a plurality of electrically conductive stator discs 17 which function and cooperate electrically with the rotor in a manner explained below in connection with the description of the rotor. Stator discs 17 are supported internally of sleeve 16 as seen in FIG. 1 by a number of axially extending, radial ribs 18. These ribs are electrically nonconducting and are circumferentially spaced about the inside of sleeve 16. They appear in side elevation in FIG. 1 and in cross section in FIG. 2. Ribs 18 support stator discs 17 by means of notches 19 in the disc peripheries spaced and sized to receive the ribs with a sliding fit. See FIG. 2. In this manner, stator discs 17 are prevented from rotating and permitted axial movement. The largest diameter of each disc 17 is less than the internal diameter of sleeve 16 so that the electrically conductive discs are not electrically connected with other parts of the stator structure.

The rotor comprises a plurality of thin electrically conductive rotor discs 20 mounted on shaft 12. As shown in FIG. 1, discs 20 lie generally in axially spaced-apart parallel planes normal to the axis of the shaft and within the central portion of the stator. Discs 20 are electrically insulated from the shaft as by nonconducting bushings 21. Discs 20 are also secured to the shaft in any suitable manner preventing their rotation relative to it while permitting their limited axial movement along it. Each disc 20 on shaft 12 is rotatable in a plane normal to and cooperates with the flux field of electromagnetic coil 14.

As shown in FIG. 1, stator discs 17 extend radially into the spaces between and are interleaved with rotor discs 20. The electrically conductive stator discs 17 comprise means especially adapted to connect electrically the rotor discs 20 so that the voltages developed across them are added and so that the total torque developed by the machine is the sum of the torques developed by the discs. To this end, the radial extent of stator discs 17 and of rotor discs 20 is preferably substantially coextensive. One face of each stator disc 17 is provided with an axially raised annular rib 22 opposite the radially inner periphery of the rotor disc 20 next to it. The opposite face of each stator disc 17 also has a raised annular rib 23 axially opposite the radial outer periphery of the adjacent rotor disc 20.

All the stator discs 17 are arranged with their smaller-diameter ribs 22 facing the same direction. Annular ribs 22 and 23 are in sliding contact with their adjacent rotor discs 20, and may be faced with a good conductor such as copper. Thus, each stator disc 17 electrically connects the inner periphery of one disc 20 with the outer periphery of the next adjacent rotor disc 20. Together, all the stator discs 17 electrically connect all the rotor discs 20 in series so that the total current through the machine passes through each rotor disc radially and in the same direction.

Electrical connection with the ends of the series combination of rotor discs is made by means of conventional brushes 24 mounted in end bell 11a and brushes 25 similarly mounted in end bell 11b. Brushes 24 engage the rotor at its outer periphery and brushes 25, at the rotor's inner periphery. Brushes 24 and 25 are spring biased toward each other and against their adjacent rotor discs, and, thereby, resiliently urge all the axially adjustable rotor and stator discs into good electrical contact from one end of the rotor to the other.

A homopolar electrodynamic machine as described above may be used as a motor or a generator. When operated as a generator, magnetic field coil 14 is energized and shaft 12 is driven causing rotation of the rotor discs 20 in planes intersecting the magnetic flux lines produced by the field coil. An EMF is thus produced across the radial extent of each rotor disc 20 according to well-known principles. Because the rotor discs 20 are connected radially in series by the stator discs 17, the voltages generated in the various rotor discs will be summed. The total voltage generated in the multiple rotor discs is then available for useful work at the terminal brushes 24 and 25.

When the homopolar machine is operated as a motor, a source of potential (not shown) is connected to brushes 24 and 25 to produce current flow between them. Again, a magnetic field is produced by magnetic field coil 14 substantially parallel to the longitudinal axis of shaft 12. Stator discs 17 interconnect rotor discs 20 so that current flows radially in the same direction in each rotor disc, either toward the shaft 12 or toward the outer periphery of the disc. Torque is produced according to well-known principles and tends to rotate the rotor discs 20 in one or the other direction, depending upon the radial direction of current flow in the discs and the direction of the magnetic field produced by coil 14. The direction of rotation is easily reversed by merely reversing the polarity of the potential applied at terminal brushes 24 and 25. The amount of torque produced for given values of current and magnetic field strength varies with the number of rotor discs connected together. The torque producing and the generating capacity of the homopolar machine may be varied by merely employing different numbers of rotor discs to produce a machine with the desired output characteristics.

The use of stator discs as described above affords a simple, effective, and compact means for connecting together a plurality of stator discs without a large number of conventional brush connections. This invention permits machines of various ratings to be constructed by merely interleaving the appropriate number of stator discs with the required number of rotor discs for the machine rating desired. In addition, the stator discs may be easily inspected for wear and replaced if necessary by sliding the discs off the shaft 12.

A homopolar motor utilizing the present invention is particularly useful as a servomotor having fast response when reversing and a high torque-to-inertia ratio. The principal disadvantage of requiring a very high current for a given torque is virtually eliminated by the provision of multiple torque producing rotor discs and the simple and efficient means for electrically interconnecting the discs.

Various modifications may be made in the form of the invention disclosed herein. For example, the rotor discs 20 instead of the stator discs 17 may be provided with one or both annular ribs 22 and 23. Also, means other than the specific annular ribs 22 and 23 may be employed to provide electrical contact between adjacent stator and rotor discs. Therefore, this invention is not to be limited to the form herein specifically disclosed or in any manner inconsistent with the progress in the art which the invention has promoted.

I claim:
1. In a homopolar electrodynamic machine having a housing, a shaft, means for providing a magnetic field, and a plurality of electrically conductive rotor discs electrically insulated from and axially spaced along said shaft for rotation therewith in planes normal to said magnetic field, the improvement which comprises:
  a plurality of electrically conductive nonrotatable stator discs supported by and electrically insulated from said housing and electrically insulated from each other and interleaved between said rotor discs to serve as portions of a series current path between said rotor discs,
  means electrically connecting said stator discs and a radially inner portion of the rotor disc adjacent to each of them on the one side, and
  means electrically connecting said stator discs and a radially outer portion of the rotor disc adjacent to each of them on the other side,
  whereby said rotor discs are connected in series and current is directed through each of said rotor discs in the same radial direction.

2. The improvement of claim 1 wherein said means electrically connecting each stator disc and its adjacent rotor discs comprise axially extending annular ribs on at least one of said discs.

3. The improvement of claim 1 further comprising resilient biasing means for maintaining said rotor discs and said stator discs in electrical contact.

4. In a homopolar dynamoelectric machine having a shaft and a housing, the combination comprising:
  a plurality of longitudinally spaced electrically conductive rotor discs positioned on and keyed to said shaft and electrically insulated therefrom, said rotor discs being slidable relative to said shaft,
  a plurality of electrically conductive stator discs interleaved between said rotor discs and keyed to and electrically insulated from said housing, said stator discs being slidable relative to said shaft,
  means at a radially inner portion of each of said stator discs electrically connecting said stator disc to the adjacent rotor disc on one side of it,
  means adjacent a radially outer portion of each of said stator discs electrically connecting said stator disc to the adjacent rotor disc on the other side of it,
  means for producing a unidirectional magnetic field substantially parallel to the axis of said shaft and intersecting said rotor discs substantially normal to their planes of rotation,
  terminal brush means connected only to the endmost of said rotor discs, and
  resilient means connected to said terminal brush means for maintaining electrical contact between said terminal brush means, said rotor discs, and said stator discs.